(12) United States Patent
Ngo

(10) Patent No.: US 9,864,887 B1
(45) Date of Patent: Jan. 9, 2018

(54) ENERGIZING SCANNERS

(71) Applicant: Hand Held Products, Inc., Fort Mill, SC (US)

(72) Inventor: Tim Thoi Ngo, Duluth, GA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 15/204,465

(22) Filed: Jul. 7, 2016

(51) Int. Cl.
*G06K 7/10* (2006.01)
*H04B 1/3827* (2015.01)
*H04W 4/20* (2009.01)
*G06K 7/14* (2006.01)

(52) U.S. Cl.
CPC ..... *G06K 7/10891* (2013.01); *G06K 7/10207* (2013.01); *G06K 7/10297* (2013.01); *G06K 7/1413* (2013.01); *G06K 7/1417* (2013.01); *H04B 1/385* (2013.01); *H04W 4/20* (2013.01)

(58) Field of Classification Search
CPC .......... G06K 7/10881; G06K 7/10891; G06F 1/163; G06F 2203/0331; G06F 3/014
USPC .................. 235/462.43–462.49, 462.01, 454
See application file for complete search history.

(56) References Cited

U.S. PATENT DOCUMENTS

| | | | |
|---|---|---|---|
| 5,340,972 A * | 8/1994 | Sandor | G06K 7/10564 235/462.44 |
| 5,610,387 A | 3/1997 | Bard et al. | |
| 6,300,880 B1 * | 10/2001 | Sitnik | H04L 29/06 235/375 |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Horn et al. | |

(Continued)

FOREIGN PATENT DOCUMENTS

WO 2013163789 A1 11/2013
WO 2013173985 A1 11/2013
(Continued)

OTHER PUBLICATIONS

U.S. Appl. No. 14/715,916 for Evaluating Image Values, filed May 19, 2015 (Ackley); 60 pages.
(Continued)

*Primary Examiner* — Jamara Franklin
(74) *Attorney, Agent, or Firm* — Additon, Higgins & Pendleton, P.A.

(57) ABSTRACT

A device, mobile system, and method for scanning a source of information are described. During scan operations, the scanning device is energized by an on-board supercapacitor power source and is worn upon an extremity of a user. The scanning device is operable for scanning the information source, accessing the information from the source based on the scanning, and generating a signal comprising data related to the accessed information. The generated scan data signal is transmitted for processing to a base station, which is worn remotely from the scanning device, for example on the user's belt.

20 Claims, 8 Drawing Sheets

(56) References Cited

U.S. PATENT DOCUMENTS

| | | |
|---|---|---|
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Van Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El Akel et al. |
| 8,978,981 B2 | 3/2015 | Guan |
| 8,978,983 B2 | 3/2015 | Bremer et al. |

(56) References Cited

U.S. PATENT DOCUMENTS

| | | |
|---|---|---|
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,123 B2 | 9/2016 | Hejl |
| 9,443,222 B2 | 9/2016 | Singel et al. |
| 9,478,113 B2 | 10/2016 | Xie et al. |
| 2002/0030094 A1 | 3/2002 | Curry et al. |
| 2007/0063048 A1 | 3/2007 | Havens et al. |
| 2008/0197199 A1 | 8/2008 | Terlizzi et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0093840 A1 | 4/2011 | Pynenburg et al. |
| 2011/0169999 A1 | 7/2011 | Grunow et al. |
| 2011/0202554 A1 | 8/2011 | Powilleit et al. |
| 2011/0309145 A1 | 12/2011 | Richardson et al. |
| 2012/0109399 A1 | 5/2012 | Tran |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0317753 A1 | 11/2013 | Kamen et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |

(56) References Cited

U.S. PATENT DOCUMENTS

| | | |
|---|---|---|
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Wilz, Sr. et al. |
| 2016/0314294 A1 | 10/2016 | Kubler et al. |

FOREIGN PATENT DOCUMENTS

| | | |
|---|---|---|
| WO | 2014019130 A1 | 2/2014 |
| WO | 2014110495 A1 | 7/2014 |

OTHER PUBLICATIONS

U.S. Appl. No. 29/525,068 for Tablet Computer With Removable Scanning Device, filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 29/530,600 for Cyclone, filed Jun. 18, 2015 (Vargo et al); 16 pages.

U.S. Appl. No. 14/707,123 for Application Independent DEX/UCS Interface, filed May 8, 2015 (Pape); 47 pages.

U.S. Appl. No. 14/283,282 for Terminal Having Illumination and Focus Control, filed May 21, 2014 (Liu et al.); 31 pp.; now abandoned.

(56) References Cited

OTHER PUBLICATIONS

U.S. Appl. No. 14/705,407 for Method and System to Protect Software-Based Network-Connected Devices From Advanced Persistent Threat, filed May 6, 2015 (Hussey et al.); 42 pages.
U.S. Appl. No. 14/704,050 for Intermediate Linear Positioning, filed May 5, 2015 (Charpentier et al.); 60 pages.
U.S. Appl. No. 14/705,012 for Hands-Free Human Machine Interface Responsive to a Driver of a Vehicle, filed May 6, 2015 (Fitch et al.); 44 pages.
U.S. Appl. No. 14/715,672 for Augumented Reality Enabled Hazard Display, filed May 19, 2015 (Venkatesha et al.); 35 pages.
U.S. Appl. No. 14/735,717 for Indicia-Reading Systems Having an Interface With a User's Nervous System, filed Jun. 10, 2015 (Todeschini); 39 pages.
U.S. Appl. No. 14/702,110 for System and Method for Regulating Barcode Data Injection Into a Running Application on a Smart Device, filed May 1, 2015 (Todeschini et al.); 38 pages.
U.S. Appl. No. 14/747,197 for Optical Pattern Projector, filed Jun. 23, 2015 (Thuries et al.); 33 pages.
U.S. Appl. No. 14/702,979 for Tracking Battery Conditions, filed May 4, 2015 (Young et al.); 70 pages.
U.S. Appl. No. 29/529,441 for Indicia Reading Device, filed Jun. 8, 2015 (Zhou et al.); 14 pages.
U.S. Appl. No. 14/747,490 for Dual-Projector Three-Dimensional Scanner, filed Jun. 23, 2015 (Jovanovski et al.); 40 pages.

U.S. Appl. No. 14/740,320 for Tactile Switch for a Mobile Electronic Device, filed Jun. 16, 2015 (Bamdringa); 38 pages.
U.S. Appl. No. 14/740,373 for Calibrating a Volume Dimensioner, filed Jun. 16, 2015 (Ackley et al.); 63 pages.
U.S. Appl. No. 13/367,978, filed Feb. 7, 2012, (Feng et al.); now abandoned.
U.S. Appl. No. 14/277,337 for Multipurpose Optical Reader, filed May 14, 2014 (Jovanovski et al.); 59 pages; now abandoned.
U.S. Appl. No. 14/446,391 for Multifunction Point of Sale Apparatus With Optical Signature Capture, filed Jul. 30, 2014 (Good et al.); 37 pages; now abandoned.
U.S. Appl. No. 29/516,892 for Table Computer, filed Feb. 6, 2015 (Bidwell et al.); 13 pages.
U.S. Appl. No. 29/523,098 for Handle for a Tablet Computer, filed Apr. 7, 2015 (Bidwell et al.); 17 pages.
U.S. Appl. No. 29/528,890 for Mobile Computer Housing, filed Jun. 2, 2015 (Fitch et al.); 61 pages.
U.S. Appl. No. 29/526,918 for Charging Base, filed May 14, 2015 (Fitch et al.); 10 pages.
Namisnyk, "A Survey of Electrochemical Supercapacitor Technology" University of Technology, Sydney, Faculty of Engineering, Jun. 23, 2003, pp. 1-122.
Extended Eurpean Search Report in related European Application No. 17179421.7 dated Nov. 7, 2017, pp. 1-8.

* cited by examiner

```
                                    80
                                      ↘

┌─────────────────────────────────────────────────────────────────────────┐
    │ ENERGIZE SCANNER WORN, DURING A SCAN OPERATION PERFORMED OVER THE TARGET│
    │ INFORMATION SOURCE, UPON AN EXTREMITY OF A USER, SUPPLYING ELECTRICAL POWER TO│
    │     THE SCANNER DIRECTLY FROM A CHARGED SUPERCAPACITOR DEVICE           │
    │                                  81                                     │
    └─────────────────────────────────────────────────────────────────────────┘
                                      │
                                      ▼
    ┌─────────────────────────────────────────────────────────────────────────┐
    │ ACCESS THE INFORMATION FROM THE SOURCE BASED ON THE SCAN OPERATION PERFORMED│
    │        OVER THE TARGET INFORMATION SOURCE BY THE ENERGIZED SCANNER      │
    │                                  82                                     │
    └─────────────────────────────────────────────────────────────────────────┘
                                      │
                                      ▼
    ┌─────────────────────────────────────────────────────────────────────────┐
    │ GENERATE A SIGNAL COMPRISING DATA RELATED TO THE ACCESED INFORMATION, IN WHICH│
    │    THE GENERATED DATA SIGNAL IS PROCESSED IN RELATION TO READING THE ACCESSED│
    │                                INFORMATION                              │
    │                                  83                                     │
    └─────────────────────────────────────────────────────────────────────────┘
                                      │
                                      ▼
    ┌─────────────────────────────────────────────────────────────────────────┐
    │          CHARGE AT LEAST A SECOND OF THE SUPERCAPACITOR DEVICES         │
    │                                  84                                     │
    └─────────────────────────────────────────────────────────────────────────┘
                                      │
                                      ▼
    ┌─────────────────────────────────────────────────────────────────────────┐
    │    REPLACE THE FIRST OF THE SUPERCAPACITOR DEVICES WITH AT LEAST SECOND OF THE│
    │   SUPERCAPACITOR DEVICES WHEREIN, UPON THE REPLACING STEP, THE STEP OF ENERGIZING│
    │     THE SCANNER IS PERFORMED BY THE AT LEAST SECOND OF THE SUPERCAPACITOR DEVICES│
    │                                  85                                     │
    └─────────────────────────────────────────────────────────────────────────┘
```

FIG. 8

ENERGIZING SCANNERS

TECHNOLOGY FIELD

The present invention relates generally to scanners. More particularly, example embodiments of the present invention relate to scanners configured for wear on an appendage of users.

BACKGROUND

Generally speaking, scanners are operable for accessing, capturing, gathering, reading, and/or sensing data encoded, presented, or stored by an information source. For example, optical scanners may be operable for reading graphic data patterns and others. The optical scanners may be configured to read one dimensional (1D) data patterns such as bar codes and/or two dimensional (2D) data patterns such as matrix codes. Data encoded by radio frequency identification (RFID) tags may be read by compatible scanners sensitive to the radio frequency (RF) to which the tag responds.

Scanners may be used in a wide variety of applications endeavors, and enterprises. For example, scanners are used in various logistic and commercial applications. The bar codes, matrix patterns, and RFID tags identify and characterize items such as inventory, parts, products, purchases, returns, stock, and supplies. The scanners may be deployed, disposed, and/or used in configurations suited for particular applications. For example, scanners used in high throughput logistic and/or commercial data gathering applications may be configured for ease and simplicity of use by an operator.

To maximize user mobility and productivity, such scanners may be designed for light weight, small form factor, ergonomic efficiency and safety, high portability and mobility, and power availability and longevity. Some contemporary mobile scanners may be worn on parts of the operator's body. "Ring scanners," for example, comprise a scanning device worn on a finger of the operator's hand "like a ring."

The scanners illuminate a scan target such as a 1D or 2D graphic data pattern with optical or RF radiation, sense a return of a portion of (or radiation emitted responsive to) the illuminating radiation therefrom, and generate a corresponding detection signal. Processing performed on the detection signal allows the data encoded by the scan target to be read. The processing may be performed on a base module, which is typically worn on the wrist (or another part of the forearm) of the operator. Power for energizing the ring scanner may be provided by a battery power source, which is typically disposed with or deployed on the wrist mounted base module.

For example, the '8650'™ Ring Scanner (commercially available by Honeywell™ International, a corporation in New Jersey) comprises a productivity tool for use by mobile operators for scanning barcodes. The 8650 ring scanner comprises a ring based scanning device worn on the fingers of an operator, and a base module worn on the wrist of the operator. The ring scanning device is communicatively coupled to the base module by a RF signal. The base station processes the data read by the ring scanner, and may also comprises a radio transmitter or transmitter/receiver (transceiver) operable for transmitting the data read by the base station to a remote computer for processing therewith.

The ring scanners themselves are lightweight and readily mobile. However, the base, which contains the battery power supply, one or more radio components, and a mobile computer, may be significantly heavier and larger than the ring scanner. Further, cables are used for feeding direct current (DC) electrical power from the battery in the wrist mounted base station to energize the ring scanner.

The weight and size of the wrist mounted battery and base station may cause muscular fatigue, strain, and/or overuse to the operators during extended scanning operations, which may reduce productivity. Over time, user actions taken responsive to the strain, etc. may present issues relevant to repetitive motion and associated heath issues. Moreover, the power cables extended between the wrist-mounted base station and the ring scanner may be snagged during use.

Such snagging can be inconvenient around protrusions, which are not uncommon in logistical and industrial settings. In such settings however, the snagging may also present a safety issue. For example, around moving equipment such as conveyors or other machinery, the snagged power cable may become entangled. Attached to the wrist of the operator, the possibility of such entanglement presented by the snagged power cable may merit an exercise of caution.

While maintaining the convenience of the ring scanning component of a mobile scanner system configured for wear upon the fingers of an operator's hand, it could be useful to obviate the extension of a cable for energizing the scanning component. In so doing, it could also be useful to for the base station, which may include a base electrical power source battery, to be positioned, mounted, supported, and/or worn on a strong and/or indefatigable part of an operator's body, where they are accessible, balanced, comfortable, convenient, efficient ergonomically, non-fatigue causing, safe, and secure, e.g., in relation to the wrist. It could be further useful to energize the ring scanning component, apart from a direct physical connection with the base electrical power source battery, and/or without adding the weight and size of a dedicated on-board battery thereto.

SUMMARY

Accordingly, in one aspect, an example embodiment of the present invention relates to a mobile scanner system with a ring scanning component configured for wear upon the fingers of an operator's hand and independent of a power cable extended for providing its electrical energy. An example embodiment may be implemented in which the base station of the mobile scanner system is positioned, mounted, supported, and worn on a part of an operator's clothing, or accessories where it is accessible, balanced, comfortable, convenient, efficient ergonomically, non-fatigue causing, safe, and secure. In an example embodiment, the ring scanner is energized independent of direct physical connection with the base electrical power source battery, and without adding the weight and size of a dedicated on-board battery thereto.

An example embodiment of the present invention relates to a device for scanning a source of information. The scanning device comprises a scanning component worn upon an extremity of a user. The scanning device is operable for scanning the information source, accessing the information from the source based on the scanning, and generating a signal comprising data related to the accessed information. A supercapacitor is operable as a power source for energizing the scanning component directly and is installed locally in relation thereto.

An example embodiment of the present invention relates to a mobile system for scanning a source of information. The mobile scanning system comprises a scanning component energized by a supercapacitor, a base station, and an electrical power supply.

The scanning component may correspond to the scanning device summarized above, and may be further operable for providing the generated signal to a base station. The base station is operable for processing the provided signal. The electrical power supply is operable for charging the supercapacitor power source of the scanning component, and for energizing the base station.

The scanning component comprises a first transceiver, and the base station comprises a second transceiver, which is operable for exchanging data signals with the first transceiver. The data signals relate to the generated signal comprising the data related to the accessed information.

The base station is worn by the user in a position remote from the scanning component, such as on a belt.

The information source may comprise a graphic medium. The information source may also, or alternatively, comprise a RFID tag. The scanning component may be operable optically and/or by RF.

The electrical power supply of the base station may comprise a battery and a port for docking and charging the supercapacitor power source of the scanning component. The scanning component may comprise a first of a plurality of substantially identical and operationally interchangeable scanning components. The mobile scanning system may comprise at least a second of the scanning components. During the operation of the first scanning component, the at least second scanning component may be, optionally, recharged.

Alternatively or additionally, the supercapacitor power supply may comprises a first of a plurality of substantially identical and operationally interchangeable supercapacitor power supplies, wherein the mobile scanning system comprises at least a second of the supercapacitor power supplies. During the operation of the first supercapacitor power supply, the at least second supercapacitor power supply may be, optionally, recharged.

An example embodiment of the present invention relates to a method for scanning a target source of information. The method may be performed by the mobile computer system summarized above.

In another aspect, the present invention embraces a device that includes a scanner designed to be worn upon an extremity of a user and operable to scan a target having machine-readable information to obtain the machine-readable information and includes a supercapacitor power source to provide power to the scanner.

In yet another aspect, the present invention embraces a system that includes a scanner, a base station, and an electrical power supply. Typically, the scanner is designed to be worn upon an extremity of a user and operable to scan a target having machine-readable information to obtain the machine-readable information and includes a supercapacitor power source to provide power to the scanner. The base station is typically designed to be worn by the user in a position remote from the scanner. The electrical power supply is typically disposed locally in relation to the base station to provide power to the base station. Typically, the scanner outputs the machine-readable information to the base station to decode and the power supply charges the supercapacitor power source when the scanner is docked to the base station.

In yet another aspect, the present invention embraces a method that includes energizing, with a supercapacitor device, a scanner worn, during a scan operation performed over a target having machine-readable information, upon an extremity of a user, obtaining the machine-readable information based on the scan operation performed over the target, and generating a signal including data related to the obtained information, wherein the generated data signal is processed in relation to reading the obtained information.

The foregoing illustrative summary, as well as other example features, functions and/or aspects of embodiments of the invention, and the manner in which the same are accomplished, are further explained within the following detailed description of example embodiments and each figure ("FIG.") of the accompanying drawings.

BRIEF DESCRIPTION OF THE DRAWINGS

FIG. 8 depicts a flowchart for an example scanning method, according to an embodiment of the present invention.

DESCRIPTION OF EXAMPLE EMBODIMENTS

Figure 1A:
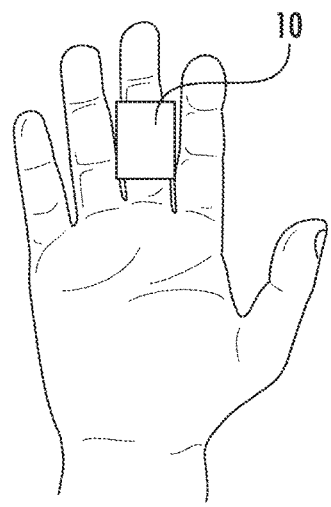
FIG. 1A depicts an example ring scanning device from a first perspective, according to an embodiment of the present invention.

Example embodiments of the present invention are described in relation to device, mobile system, and method for scanning a source of information. During scan operations, the scanning device (e.g., a scanner) is energized by an on-board supercapacitor and is worn upon an extremity of a user. The scanning device is operable for scanning the information source (e.g. a target having machine-readable information), accessing the information (e.g., machine-readable information) from the source based on the scanning, and generating a signal comprising data related to the accessed information. The generated scan data signal is transmitted for processing to a base station, which is worn remotely from the scanning device, for example on the user's belt.

Embodiments of the present invention thus provide a mobile scanner system with a ring scanning component configured for wear upon the fingers of an operator's hand and independent of a power cable extended for providing its electrical energy. An example embodiment may be implemented in which the base station of the mobile scanner system is positioned, mounted, supported, and worn on a part of an operator's clothing or accessories that are accessible, balanced, comfortable, convenient, efficient ergonomically, non-fatigue causing, safe, and secure. In an example embodiment, the ring scanner is energized independent of direct physical connection with the base electrical power source battery, and without adding the weight and size of a dedicated on-board battery thereto.

Overview

An example embodiment of the present invention relates to a device for scanning a source of information. The scanning device comprises a scanning component worn upon an extremity of a user. The scanning device is operable for scanning the information source, accessing the information from the source based on the scanning, and generating a signal comprising data related to the accessed information. A supercapacitor is operable as a power source for energizing the scanning component directly and is installed locally in relation thereto.

The scanning component may be further operable for providing the generated signal to a base station. The base station is operable for processing the provided signal and worn by the user in a position remote from the scanning component. The scanning component comprises a first transceiver, and the base station comprises a second transceiver, which is operable for exchanging data signals with the first transceiver. The data signals relate to the generated signal comprising the data related to the accessed information.

The scanning component may comprise a light source and a light sensor. The light source is operable for illuminating a scan target with illuminating light. The light sensor is operable for detecting a reflection of the illuminating light from the scan target. The accessing of the information from the information source comprises the detection of the illuminating light reflected from the scan target.

The information source may comprise a graphic medium. The scanning of the information source, and/or the accessing of the information therefrom based on the scanning is performed optically. The information source may comprise indicia, symbols, geometric, 1D, and/or 2D data patterns, bar codes, matrix code data patterns, and/or text, which e.g., may be alphanumeric, character, and/or syllabary based.

The information source may comprise an RFID tag. The scanning of the information source, and/or the accessing the information therefrom based on the scanning are performed at an RF operating characteristic of the RFID tag.

An example embodiment of the present invention relates to a mobile system for scanning a source of information. The mobile scanning system comprises a scanning component, a base station, and an electrical power supply.

The scanning component comprises a ring scanner worn, during a scan operation performed over a scan target, upon an extremity, such as one or more fingers, the palm, or the back of the hand of a user. The scanning component is energized directly by an installed, on-board supercapacitor power source. The scanning component is operable for accessing the information from the information source based on the scan operation, and generating a signal comprising data related to the accessed information.

The base station worn by the user in a position remote from the scanning component operable for processing the provided signal. The electrical power supply is disposed locally in relation to the base station. The electrical power supply is operable for charging the supercapacitor power source of the scanning component, and for energizing the base station.

The position at which the base station is worn may comprise an article of clothing or an accessory item worn by the user. The clothing article or the accessory item supports or suspends the base station physically, e.g., mechanically, upon the user in a safe, comfortable, and ergonomically efficient location in relation to the user's body, which is remote from the scanning component. For example, the clothing article or the accessory item may comprise a belt, vest, strap, pocket disposed in the clothing article, or a holster or pouch that may be suspended from the belt and/or the strap.

The electrical power supply of the base station may comprise a battery and a port for charging the supercapacitor power source of the scanning component. The scanning component may comprise a first of a plurality of substantially identical and operationally interchangeable scanning components. The mobile scanning system may comprise at least a second of the scanning components. During the operation of the first scanning component, the at least second scanning component may be, optionally, recharged.

Alternatively or additionally, the supercapacitor power supply may comprises a first of a plurality of substantially identical and operationally interchangeable supercapacitor power supplies, wherein the mobile scanning system comprises at least a second of the supercapacitor power supplies. During the operation of the first supercapacitor power supply, the at least second s supercapacitor power supply may be, optionally, recharged.

An example embodiment of the present invention relates to a method for scanning a target source of information. The method comprises energizing a scanner by electrical power supplied by a charged supercapacitor. The scanner is worn, during a scan operation performed over the target information source, upon an extremity of a user. The information is accessed from the information source based on the scan operation. A signal is generated, which comprises data related to the accessed information. The generated data signal is processed in relation to reading the accessed information.

An example embodiment may be implemented in which the supercapacitor device comprises a first of a plurality of supercapacitor devices. The method further comprises charging at least a second of the supercapacitor devices. The first of the supercapacitor devices may be replaced with the at least second of the supercapacitor devices. Upon the replacing of the first supercapacitor with the second supercapacitor, the step of energizing the scanner is performed by the at least second of the supercapacitor devices.

Example Ring Scanner.

An example embodiment of the present invention relates to a device for scanning a source of information. During use, the scanning device is worn upon an extremity of the user. For example, the scanning device may comprise a ring scanner worn on one or more digits, the palm, or the back of the user's hand.

FIG. 1A depicts an example ring scanning device 10 from a first perspective, according to an embodiment of the present invention. In the first perspective, the ring scanner 10 is shown, as worn, with respect to an upper (or lower) substantially planar surface of the hand of a user.

Figure 1B:
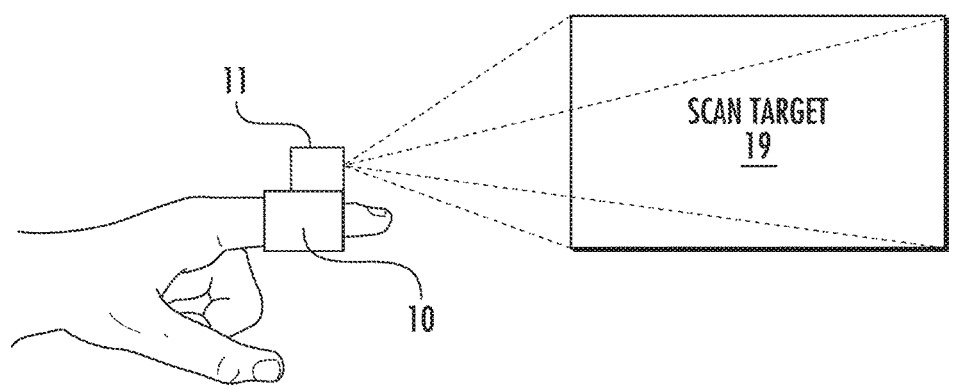
FIG. 1B depicts the example ring scanning device from a second perspective, according to an embodiment of the present invention.

FIG. 1B depicts the example ring scanner 10 from a second perspective, according to an embodiment of the present invention. In the second perspective, the ring scanner 10 is shown, as worn, with respect to the thumb side edge of the hand of a user.

The ring scanner 10 is energized directly by an on-board supercapacitor power source (e.g., supercapacitor 21; FIG.

2). The ring scanner 10 comprises a scanning component 11, which is operable for scanning (e.g., "reading," accessing information stored by) a scan target 19 information source.

Figure 2:
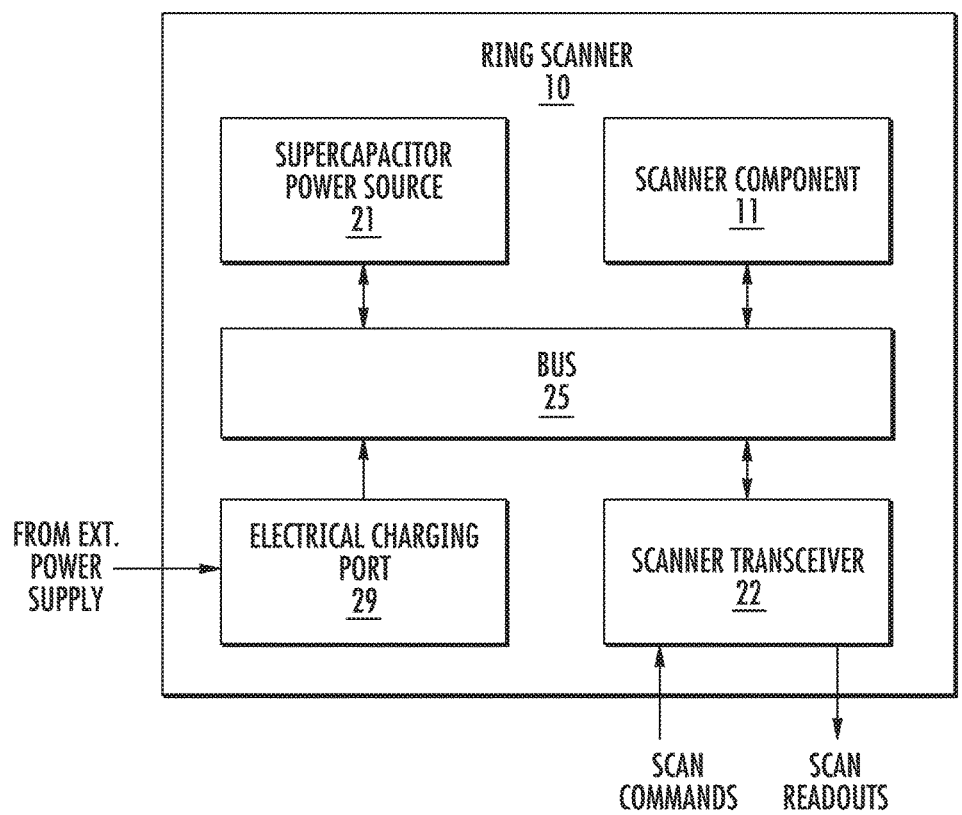
FIG. 2 depicts a block diagram of an example ring scanning device, according to an embodiment of the present invention.

FIG. 2 depicts a block diagram of the example ring scanning device 10, according to an embodiment of the present invention. During use, while performing scanning operations, the scanning device 10 is energized with electrical power supplied by a supercapacitor 21. The supercapacitor 21 is installed on board the scanning device 10 as a local component thereof.

Upon completion of a run of scanning operations, or receipt of an indication related to the supercapacitor 21 having assumed a discharged, or low power supply capacity state, the ring scanner 10 may be recharged. An example embodiment may be implemented in which the supercapacitor 21 may be recharged, or replaced with a freshly charged replacement supercapacitor. For example, the ring scanner 10, and/or the superconductor 21 may be docked (e.g., connected electrically and mechanically) to an electrical power supply disposed on an associated base station and operable for charging the docked supercapacitor. A pair (or more) of identically operable ring scanners may thus be used interchangeably, with one of them docked to a recharging source while the other energized the scanner 10.

From a discharged state, the supercapacitor 21 may be recharged fully and quickly. An example embodiment may be implemented in which the supercapacitor 21 may be recharged from a discharge state to a full charge and power supply availability state with a charging current of five Amperes (5 A) in approximately three (3). Upon the recharge, the fully charged supercapacitor may provide electrical power at an average rate of 50 Milliamps (mA) to energize the ring scanner 10 for five (5) minutes.

The supercapacitor 21 comprises a comprises a high-capacity electrochemical capacitive electrical device with capacitance values that can exceed 1,000 Faraday units (at a voltage of approximately 1.2 Volts) and has an energy storage capacity, per unit mass or volume, between one and two orders of magnitude greater than conventional capacitors. The supercapacitor 21 may be charged at a rate significantly higher than conventional rechargeable batteries, deliver electrical power to loads at similar high rates, and has high tolerance to repetitive and deep charge and discharge cycles, which is also superior to conventional rechargeable batteries.

The supercapacitor 21 may comprise an electrostatic double-layer capacitance element, carbon based electrodes, an electrolyte, and Helmholtz double layer at an interface of the electrolyte and the electrode. The supercapacitor 21 may also (or alternatively) comprise an element characterized by electrochemical pseudocapacitance, and electrodes comprising metal oxide and/or conductive polymer materials, and operable using oxidation/reduction (redox) reactivity, Faradaic electron transfer, or other electrochemical processes. Alternatively, the supercapacitor may comprise a lithium ion hybrid capacitor.

The supercapacitor 21 may sometimes also be referred to as an "ultracapacitor" and/or "electric double-layer capacitor" (EDLC). The supercapacitor 21 may be characterized and/or configured as described in Namisnyk, Adam M., *A Survey of Electrochemical Supercapacitor Technology*, U. Tech., Sydney, AU (2003), which is incorporated by reference in its entirety for all purposes as if fully set forth herein.

The scanning device 10 comprises a scanning component 11, a local scanner bus 25, and an electrical charging port 29, and a scanner transceiver 22. The local scanner bus 25 is operable for conducting DC electrical power from the supercapacitor 11 to the scanning component 11, and the scanner transceiver 22.

Figure 4:
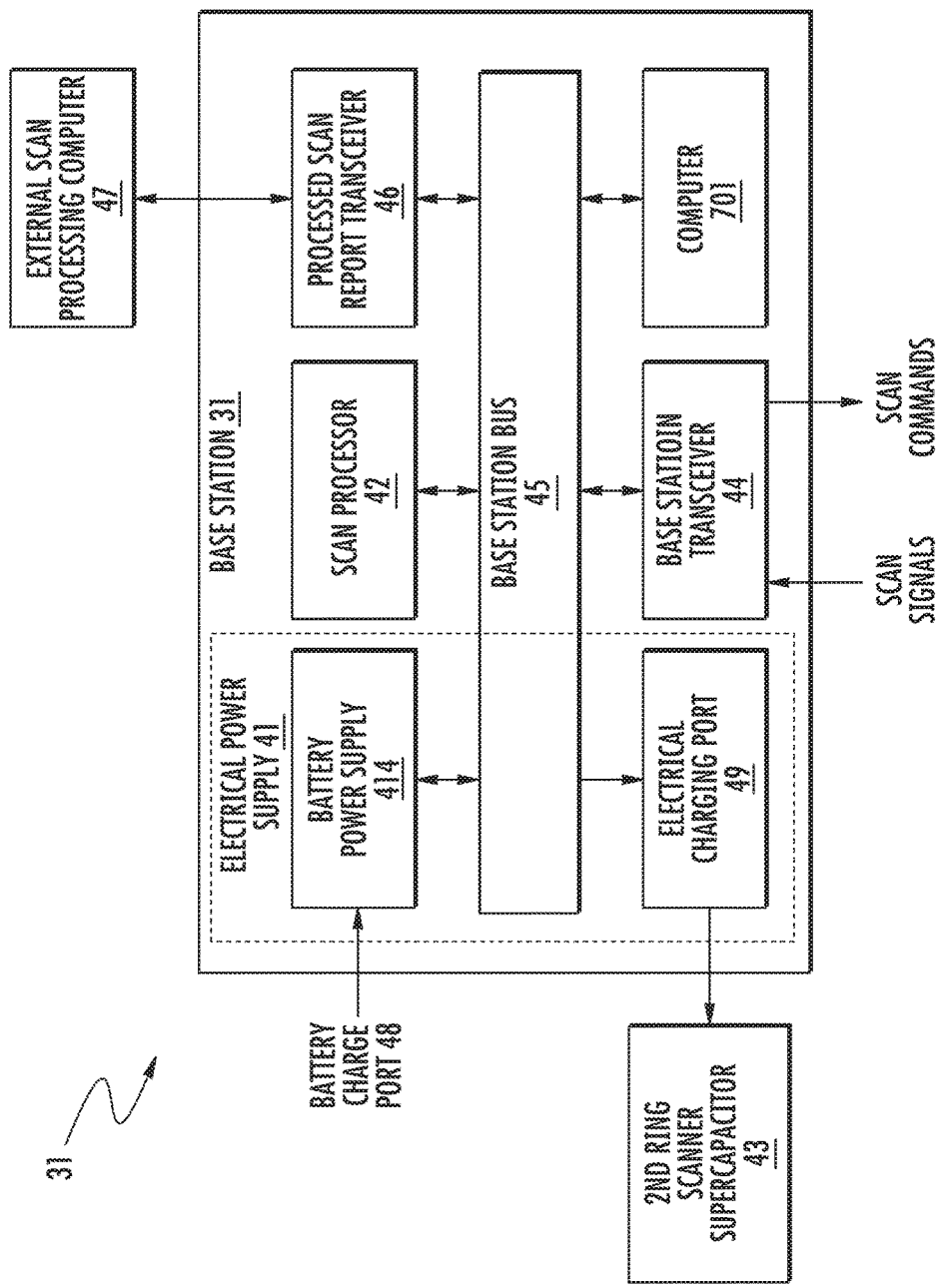
FIG. 4 depicts an example base station, according to an embodiment of the present invention.

The local scanner bus 25 is also operable for conducting DC electrical power for charging (e.g., recharging or providing an initial charge to) the supercapacitor 11. The electrical power for charging the supercapacitor 11 may be provided thereto, via the electrical charging port 29, from an external electrical power supply (e.g., battery 41; FIG. 4), such as in a base station with which the supercapacitor 21 (and the scanning device 10) may be docked.

In an example embodiment of the present invention, the ring scanning device 10 is operable for scanning the information source 19. The scanning component 11 is worn, during use, upon an extremity of a user. The scanning device is operable for scanning the information source 19, accessing the information from the information source 19 based on the scanning, and generating a signal comprising data related to the accessed information. The supercapacitor 21 is operable as a power source for energizing the scanning component 11 during the scan operation.

Figure 3:
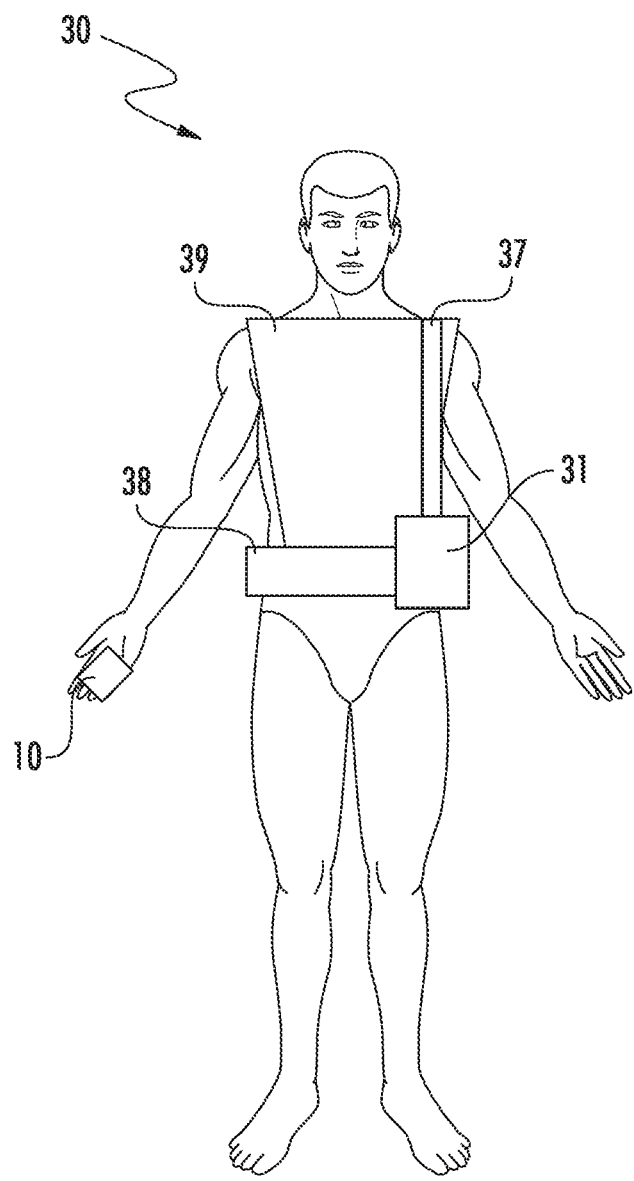
FIG. 3 depicts an example mobile scanning system, according to an embodiment of the present invention.

The scanning device 10 may be further operable for providing the generated scan signal to a base station (e.g., 31; FIG. 3, FIG. 4). The base station is operable for processing the provided signal and worn by the user in a position remote from the scanning component.

The transceiver 22 of the scanning device 10 comprises a first transceiver. The base station comprises a second transceiver, which is operable for exchanging data signals with the first transceiver 22. The data signals (e.g., "scan readouts") relate to the generated signal, which comprises the data related to the information accessed in the scan operation from the scan target 19.

The scan related data signals may be exchanged between the transceiver 22 and the base station transceiver over RF. An example embodiment may be implemented in which the transceiver 22 sends the scan related RF data signals to the base station over the Industrial Scientific and Medical (ISM) band at or near 2.4 Gigahertz (GHz), referred to as Bluetooth®.

The local scanner bus 25 is also operable for communicatively coupling the scanner transceiver 22 and the scanning component 11 for receiving the generated scan signals therefrom. Scan related commands (e.g., 'trigger scan') may be sent via the local scanner bus 25 to the scanning component 11.

Figure 5A:
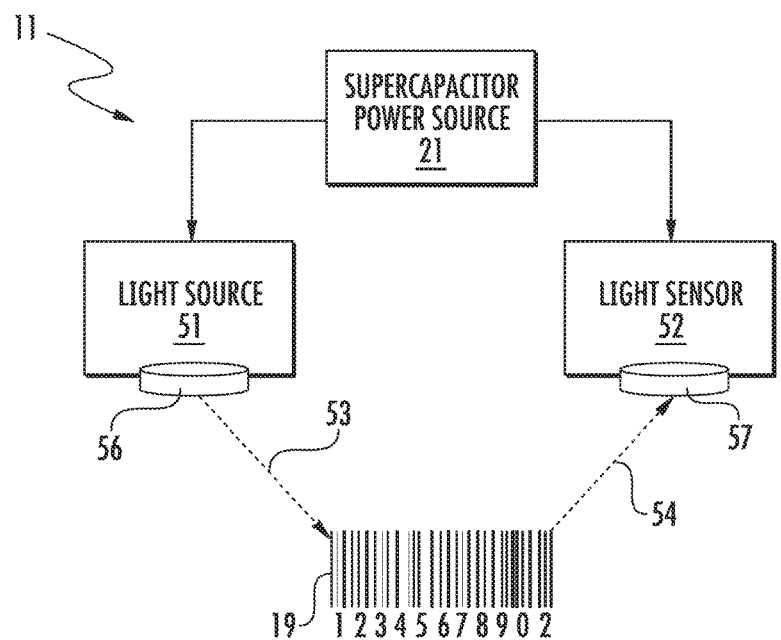
FIG. 5A depicts an example optically operable scanner, according to an embodiment of the present invention.

The scanning component 11 may be operable over optical wavelengths. The optical wavelengths may correspond to one or more infrared (IR), visible, and/or ultraviolet (UV) bands. FIG. 5A depicts an example optically operable version of the scanner 11, according to an embodiment of the present invention.

The optically operable scanning component 11 comprises a light source 51 and a light sensor 52, each of which is energized by the supercapacitor power source 21. The light source 51 may comprise an active opto-electronic device, such as a laser diode (LD), a light emitting diode (LED), or an array of such devices. The light source 51 is operable for illuminating the scan target 19 with illuminating light ("illumination") 53. Upon emission by the light source 51, the illumination 53 may be directed over the scan target 19 by illumination optics 56.

The light sensor 52 is operable for detecting a reflection 54 of the illuminating light 53 from the scan target 19. The accessing of the information from the information source comprises the detection of the illuminating light reflected from the scan target.

The light sensor 52 may comprise an active opto-electronic device such as a photodiode (PD), a charge coupled device (CCD), complementary metal oxide semiconductor (CMOS), charge-injection device (CID), charge modulation device (CMD), P-channel and/or N-channel metal oxide semiconductor field effect transistor (MOSFET) device, or an array of the devices. The devices of the array may comprise a plurality ("two or more") of the CCD, CMOS, PD, CID, CMD, P-channel MOSFET (PMOS), or N-channel MOSFET (NMOS) devices, and/or a video graphics array (VGA).

The reflection 54 may be gathered and directed to, filtered, and/or focused on the light sensor 52 by detection optics 57. The illumination optics 56 and/or the detection optics 57 may comprise a system of one or more lenses, optical fibers, filters, and/or other passive optical devices such as prisms, mirrors, windows, diffraction and/or diffusion elements, etc.

Figure 5B:
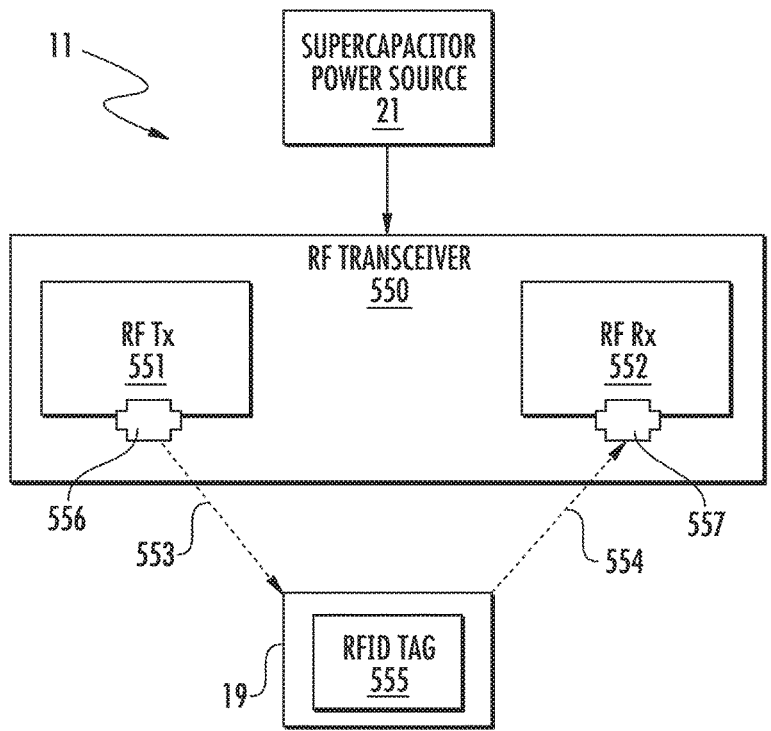
FIG. 5B depicts an example RF operable scanner, according to an embodiment of the present invention.

Alternatively or additionally, the scanning component 11 may be operable over one or more RF bands. FIG. 5B depicts an example RF operable version of the scanner 11, according to an embodiment of the present invention.

The RF operable scanning component 11 comprises an RF transceiver 550, which is energized by the supercapacitor power source 21. The RF transceiver 550 comprises an RF transmitter ('Tx') element 551 and an RF receiver ('Rx') element 552. The RF Tx element 551 is operable for transmitting an RF signal 553, via a Tx antenna 556, over the scan target 19.

An example embodiment may be implemented in which the scan target 19 comprises an RFID tag 555, which may be sensitive to the RF transmission 553. For example, the RFID tag 555 may receive the RF Tx 553 via an internal antenna of its own. An internal IC component of the RFID tag 550 is energized by the received RF transmission signal 553 and responsive thereto, may emit a RFID return signal 554, which is transmitted via its internal antenna.

The RF Rx element 552 receives the RFID return signal 554 over the Rx antenna 557. The RFID return signal 554 comprises a data signal corresponding to the information of the scan target 19. Based on the information from the scan target 19, the RF transceiver 550 (or a component associated therewith) is operable for generating the scan related data signal.

Example Scan Targets.

The scan target 19 comprises the information source, which may comprise the RFID tag 550 or a graphic medium, comprising graphic information. The graphic information may comprise indicia, symbols, geometric, one dimensional (1D), and/or two dimensional (2D) data patterns, bar codes, matrix code data patterns, and/or text, which e.g., may be alphanumeric, character, and/or syllabary based.

Figure 6A:
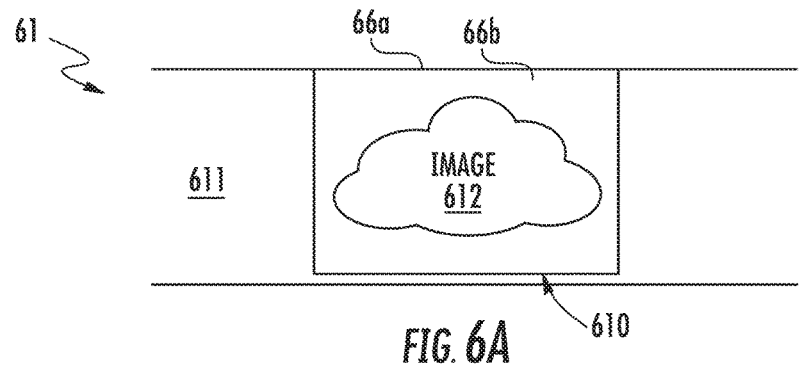
FIG. 6A depicts an example image related scan target, according to an embodiment of the present invention.

FIG. 6A depicts an example image based scan target 61, according to an embodiment of the present invention. The image based scan target 61 comprises graphic information 610. The information 610 comprises an image 612 disposed over a graphic medium 611.

Figure 6B:
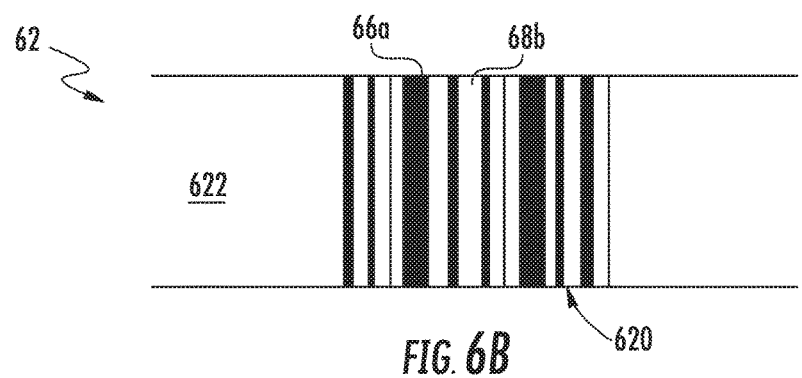
FIG. 6B depicts an example 1D data pattern scan target, according to an embodiment of the present invention.

FIG. 6B depicts an example 1D data pattern scan target 62, according to an embodiment of the present invention. The 1D bar code symbol 622 comprises an example bar code pattern 622 disposed over a graphic medium 622. The bar code symbol 622 comprises a plurality of bar elements 66a and a plurality of space elements 68b. The space elements 68b are disposed in parallel with the bar elements 66a.

The bar code symbol 620 may correspond to data patterns related to, for example, an International (or "European") Article Number and/or Universal Product Code (EAN/UPC symbology) pattern, PDF417 (ISO/EC-15438 related) pattern, which comprise four of the vertical bar like symbols 66a disposed over 17 of the horizontally disposed spacer symbols 68b), 1D dot code pattern, or other 1D symbols.

Figure 6C:
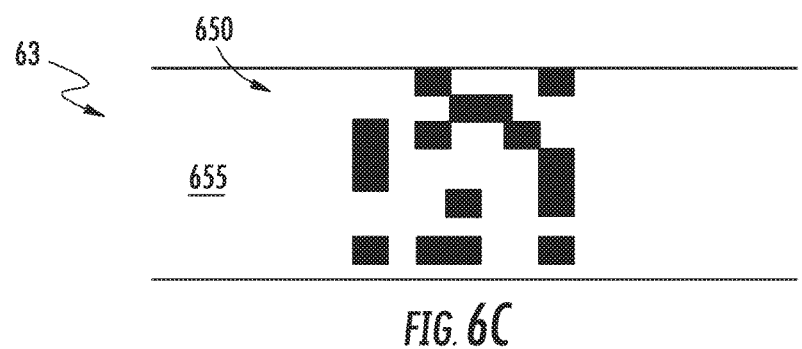
FIG. 6C depicts an example 2D data pattern scan target, according to an embodiment of the present invention.

FIG. 6C depicts an example 2D data pattern scan target 63, according to an embodiment of the present invention. The 2D scan target 63 comprises a matrix pattern, which comprises an array of 2D graphic symbol parts, such as squares and other rectangle and polygons, disposed over a graphic medium 655. The matrix data pattern 650 may correspond to a 2D data pattern related to, for example, quick-response (QR) and/or Han Xin graphical or geometric data matrices, or other 2D symbols.

Figure 6D:
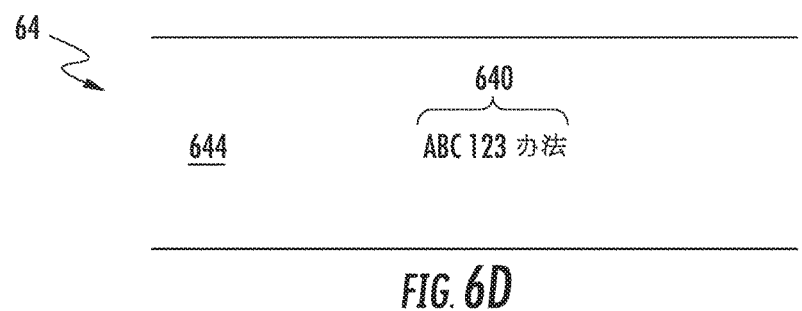
FIG. 6D depicts an example text based 'OCR' scan target, according to an embodiment of the present invention.

FIG. 6D depicts an example text based code pattern scan target 64, according to an embodiment of the present invention. The text based scan target 64 comprises alphanumeric, character, or syllabary based text or other text related graphic symbol parts (e.g., OCR patterns), disposed over a graphic medium 644. The code pattern 640 may comprise human readable and optical character recognition (OCR) readable symbol parts, such as numbers, letters, characters, and syllables printed on a print medium 644. The data pattern 640 may comprise a 2D data pattern related to, for example, OCR-B or OCR-A, or other 2D symbols.

Example Scanner System.

An example embodiment of the present invention relates to a mobile system for scanning a source of information. FIG. 3 depicts an example mobile scanning system 30, according to an embodiment of the present invention. The mobile scanning system 30 comprises the ring scanning component 10, a base station 31, and an electrical power supply (e.g., battery 41; FIG. 4).

The ring scanning component 10 is worn, during scan operations performed over scan targets, upon an extremity, such as one or more fingers, the palm, or the back of the hand of a user. The scanning component 10 is energized directly by an installed, on-board supercapacitor power source (21; FIG. 2). The scanning component 10 is operable for accessing the information from the information source based on the scan operation, and generating a signal comprising data related to the accessed information. The base station 31 is worn by the user in a position remote from the scanning component, and operable for processing the provided signal.

The position at which the base station is worn may comprise an article of clothing 39 or an accessory item worn by the user. The accessory item may comprise a belt 38 or a strap 37. The clothing article 39 or the accessory item (38, 37) supports or suspends the base station 31 physically, e.g., mechanically, upon the user in a safe, comfortable, and ergonomically efficient location in relation to the user's body, which is remote from the ring scanning component 10. For example, the clothing article 39 or the accessory item (38, 37) may comprise a belt, vest, strap, pocket disposed in the clothing article, or a holster or pouch that may be suspended from the belt and/or the strap.

While worn by the user in locations remote from each other, the ring scanner 10 and the base station 31 are communicatively coupled wirelessly via an exchange of RF signals. An example embodiment may be implemented in which the ring scanner 10 and the base station 31 communicate via Bluetooth® RF signals (or other ISM RF band).

FIG. 4 depicts an example base station 31, according to an embodiment of the present invention. The base station electrical power supply 41 is disposed locally in relation to the base station. The base station electrical power supply 41 comprises a rechargeable battery 414. The battery 414 may comprise a lithium ion (Li-ion) battery. The base station electrical power supply 41 is operable for providing DC electrical power for charging the supercapacitor power source 21 of the scanning component 10, and for energizing the base station 31.

The base station electrical power supply 41 may comprise the battery 414, a port 48 for charging (e.g., recharging) the battery 414, and a port 49 for charging the supercapacitor power source 21 of the ring scanning component 10. The scanning component 10 may comprise a first of a plurality of substantially identical and operationally interchangeable scanning components. The mobile scanning system 30 may comprise at least a second of the scanning components 43. During the operation of the first scanning component 10, the at least second scanning component 43 may be, optionally, recharged via the port 49.

Alternatively or additionally, the supercapacitor power supply 21 may comprises a first of a plurality of substantially identical and operationally interchangeable supercapacitor power supplies. The mobile scanning system 30 comprises at least a second of the supercapacitor power supplies. During the operation of the first supercapacitor power supply 10, the at least second s supercapacitor power supply may be, optionally, recharged via the port 49. Both the multiple ring scanner implementation and the multiple supercapacitor implementation provide continuous availability of an energized, operational scanner, which may thus reduce or eliminate scanner downtime due to unavailability of an energized, operational scanner.

The base station 31 comprises a base station bus 45, and the base station ("second") RF transceiver 44. The base station transceiver 44 is operable for receiving the scan related data signals generated by the ring scanner 10 and transmitted by the scanner ("first") transceiver 22 (FIG. 2), e.g., via Bluetooth®. The base station transceiver 44 may also be operable for sending scan related commands (e.g., 'configuration') to the ring scanner 10.

The base station 31 may also comprise a scan processor and a processed scan report transceiver 46. The scan processor 42 is operable for processing the information received in the scan related data signals and providing a corresponding output processed scan data signal.

The processed scan report transceiver 46 is operable for transmitting the processed scan data signal to an external scan data processing computer entity 47. Additionally or alternatively, the processed scan data signal may be processed locally in relation to the base station 31. For example, the base station 31 may comprise an on board computer 701, which may be disposed in the base station 31 or deployed and operated locally therewith.

The base station bus 45 may be operable for distributing electrical power from the battery 414 to the other components of the base station 31. The base station bus 45 may be operable for allowing the other components of the base station 31 to exchange data signals.

The mobile scanner system 30 may be operable for performing a scanner process, which may relate to an example scanning method described below.

Example Scanning Method.

An example embodiment of the present invention relates to a method 30 for scanning a target source of information. The method 80 may be performed by the scanner system 30, described above.

In a step 81, a scanner is energized by electrical power supplied by a charged supercapacitor. The scanner is worn, during a scan operation performed over the target information source, upon an extremity of a user.

In a step 82, the information is accessed from the scan target information source based on the scan operation.

In a step 83, a signal is generated, which comprises data related to the accessed information. The generated data signal is processed in relation to reading the accessed information.

An example embodiment may be implemented in which the supercapacitor device comprises a first of a plurality of supercapacitor devices. In a step 84, the method 80 may further comprise charging at least a second of the supercapacitor devices.

In a step 85, the first of the supercapacitor devices may be replaced with the at least second of the supercapacitor devices. Upon the replacing of the first supercapacitor with the second supercapacitor, the step of energizing the scanner is performed by the at least second of the supercapacitor devices.

An example embodiment of the present invention relates to a non-transitory computer readable storage medium comprising instructions. Upon execution by one or more processors of a computer system, the instructions are operable for performing, controlling, and/or programming one or more steps of the scanning method 80.

Example Computer and Network Platform.

An example embodiment may be implemented in which one or more components of the scanner system 100 (e.g., scan processor 42) are configured in electronic or computer based hardware, software stored physically (e.g., electronically, optically, electromagnetically) in non-transitory computer readable storage media such as dynamic memory, flash memory, drives, caches, buffers, registers, latches, memory cells, or the like.

Figure 7:
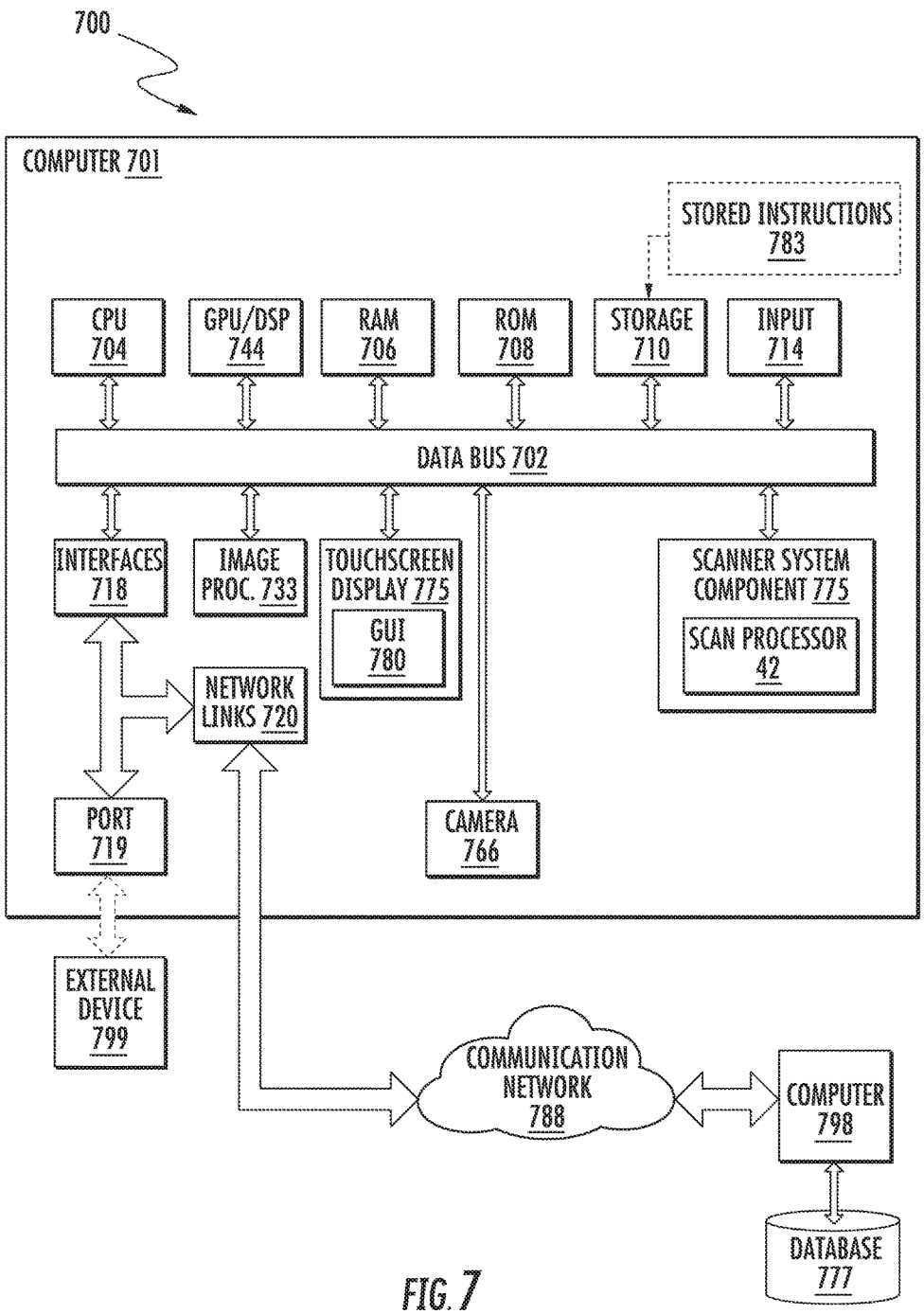
FIG. 7 depicts an example computer and data network, with which an embodiment of the present invention may be practiced.

FIG. 7 depicts an example computer and network platform 700, with which an embodiment of the present invention may be practiced. The computer and network platform 700 comprises a first computer system ("computer") 701 and a data communication network 788.

The computer 701 comprises one or more components 775 of the scanner system 30 (e.g., scan processor 42). An example embodiment may be implemented in which the computer 701 comprises a component of the base station 31, or is disposed locally in relation thereto and/or deployed and operated locally in association therewith.

The computer 701 also comprises a touchscreen display 725. An example embodiment may be implemented in which a graphical user interface (GUI) 780 is rendered and actuated by the touchscreen display 725. The computer 701 may also comprise a camera 766. An example embodiment may be implemented in which the camera 766 functions with the scanner system 30.

The network 788 may comprise a packet-switched data network operable based on transfer control and internetworking protocols (e.g., TCP/IP). The computer 701 may be coupled communicatively, and exchange data signals, over the data communication network 788 with at least a second computer 798, which is coupled communicatively with the data network 788.

The data network 788 may comprise a portion of one or more other networks and/or two or more sub-network ("subnet") components. For example, the data network 788 may comprise a portion of the internet and/or a particular wide area network (WAN). The network 788 may also comprise one or more WAN and/or local area network (LAN) subnet components. Portions of the data network 788 may be operable wirelessly and/or with wireline related means. The data network 788 may also comprise, at least in part, a communication network such as a digital telephone network.

An example embodiment may be implemented in which the computer 701 is operable for sending data to the computer 798 in relation to the operations of the scanner system 30 over the data network 788. The computer 798 may then store scanner system operation related data in the database 777, from which it may be retrieved at a later time. The computer 701 may be operable for presenting a query to the computer 798 for input to the database 777, and for receiving corresponding replies, over the data communications network 788.

The computer 701 comprises a plurality of electronic components, each of which is coupled to a data bus 702. The data bus 702 is operable for allowing each of the multiple, various electronic components of computer 701 to exchange data signals with each of the other electronic components.

The electronic components of the computer 701 may comprise IC devices, including one or more microprocessors. The electronic components of the computer 701 may also comprise other IC devices, such as a microcontroller, field-programmable gate array (FPGA) or other programmable logic device (PLD) or application-specific IC (ASIC).

The microprocessors may comprise a central processing unit (CPU) 704. The CPU 704 is operable for performing general data processing functions related to operations of the GRUI and other components of the computer 701. The electronic components of the computer 701 may also comprise one or more other processors 744.

For example, the other microprocessors may comprise a graphics processing unit (GPU) and/or digital signal processor (DSP) 704, which are each operable for performing data processing functions that may be somewhat more specialized than the general processing functions, as well as sometimes sharing some processing functions with the CPU 704.

One of the processors 744 may also be operable as a "math" (mathematics) coprocessor. The math co-processor, DSP and/or GPU ("DSP/GPU") 744 are operable for performing computationally intense data processing. The computationally intense processing may relate to imaging, image evaluation, graphics, dimension measurements, wireframe manipulations, coordinate system management, control, and other (e.g., mathematical, financial) information, any of which may relate to the scan based information. One of the microprocessors may comprise an image processor 733, which is operable for processing images and video feed from the camera 766 and scan related image data from a scan target of the scanner system 30.

The data processing operations comprise computations performed electronically by the image processor 333, CPU 704, and the DSP/GPU 744. The microprocessors may comprise components operable as an ALU, a FPU, and associated memory cells. The memory cells comprise non-transitory data storage media, which may be configured as caches (e.g., "L1," "L2"), registers, latches and/or buffers.

The memory cells are operable for storing data electronically in relation to various functions of the processor. A translational look-aside buffer (TLB) may be operable for optimizing efficiency of use of content-addressable memory (CAM) by the CPU 704, and/or the DSP/GPU 744, etc.

The computer 701 also comprises non-transitory computer readable storage media operable for storing data, e.g., electronically. For example, the computer readable storage media comprises a main memory 706, such as a random access memory (RAM) or other dynamic storage medium. The main memory 706 is coupled to data bus 702 for storing information and instructions, which are to be executed by the CPU 704.

The main memory 706 may also be used for storing temporary variables or other intermediate information during execution of instructions by the CPU 704. Other memories (represented in the present description with reference to the RAM 706) may be installed for similar uses by the DSP/GPU 744.

The printing evaluation system 300 further comprises a read-only memory (ROM) 708 or other static storage medium coupled to the data bus 702. The ROM 708 is operable for storing static information and instructions for use by the CPU 704. In addition to the RAM 706 and the ROM 708, the non-transitory storage media may comprise at least one data storage device 710. The data storage device 710 is operable for storing information and instructions and allowing access thereto.

The data storage device 710 may comprise a magnetic disk drive, flash drive, or optical disk drive (or other non-transitory computer readable storage medium). The data storage device 710 comprises non-transitory media coupled to data bus 702, and may be operable for providing a "virtual memory" function. The virtual memory operations of the storage device 710 may supplement, at least temporarily, storage capacity of other non-transitory media, such as the RAM 706. An example embodiment may be implemented in which one or more of the processors and/or the non-transitory storage components perform computations relating to operations of one or more components of the base station 30.

The non-transitory storage media comprises instructions 783, which are stored (e.g., electronically, magnetically, optically, physically, etc.) in relation to software for programming, controlling, and/or configuring operations of the computer 701 and its components, including the printing system 100, the camera 766, the GUI 80, etc. The instructions 783 may also relate to the performance of one or more steps of the scanning method 80 (FIG. 8).

Instructions, programming, software, settings, values, and configurations, etc. related to the method 60, the scanning system 30 and its components 775, and other operations of the computer 701 are stored (e.g., magnetically, electronically, optically, physically, etc.) by the storage medium 710, memory, etc.

The computer 701 comprises a user-interactive display configured as the touchscreen 725, which is operable as a combined display and the GUI 780. The touchscreen 725 may comprise a liquid crystal display (LCD), which is operable for rendering images by modulating variable polarization states of an array of liquid crystal transistor components. The touchscreen 725 also comprises an interface operable for receiving haptic inputs from a user.

The haptic interface of the GUI 780 and touchscreen 725 may comprise, e.g., at least two arrays of microscopic (or transparent) conductors, each of which is insulated electrically from the other and disposed beneath a surface of the display 725 in a perpendicular orientation relative to the other. The haptic inputs comprise pressure applied to the surface of the touchscreen 725 and GUI 780, which cause corresponding local changes in electrical capacitance values proximate to the pressure application that are sensed by the conductor grids to effectuate a signal corresponding to the input.

Images and video received from the camera 766 and/or the scanner system 30 may also be presented on the display 725.

The touchscreen 725 may be implemented operably for rendering images over a heightened (e.g., high) dynamic range (HDR). The rendering of the images may also be based on modulating a back-light unit (BLU). For example, the BLU may comprise an array of light emitting diodes (LEDs). The LCDs may be modulated according to a first signal and the LEDs of the BLU may be modulated according to a second signal. The touchscreen 725 may render an HDR image by coordinating the second modulation signal in real time, relative to the first modulation signal.

Other display technologies may also (or alternatively) be used. For example, the display 725 may comprise an organic LED (OLED) array. The display 725 may also (or alternatively) comprise a display operable over a standard dynamic range (SDR), sometimes also referred to as a "low dynamic range" (LDR).

An input receiver 714 may comprise one or more electromechanical switches, which may be implemented as buttons, escutcheons, microelectromechanical sensors (MEMS) or other sensors, dual in-line package (DIP) switch, etc. The input receiver 714 may also comprise cursor and trigger controls such as a mouse, joystick, etc. and/or a keyboard. The keyboard may comprise an array of alphanumeric and/or ideographic, syllabary based keys operable for typing corresponding letters, number, and/or other symbols. The keyboard may also comprise an array of directional (e.g., "up/down," "left/right") keys, operable for communicating commands and data selections to the CPU 704 and for controlling movement of a cursor rendering over the touchscreen display 725. The inputs may also be made by voice actuation.

The directional keys may be operable for presenting two (2) degrees of freedom of a cursor, over at least two (2) perpendicularly disposed axes presented on the display component of the touchscreen 725. A first 'x' axis is disposed horizontally. A second 'y' axis, complimentary to the first axis, is disposed vertically. Thus, the printing evaluation system 300 is thus operable for specifying positions over a representation of a geometric plane and/or other coordinate systems.

Execution of instruction sequences contained in the storage media 710 and main memory 706 cause the CPU 704 to perform processing related to general operations of the computer 701, the DSP/GPU 744 to perform various other processing operations, and the components of the printing system 100 to perform processing steps related to the example method 80. Additionally or alternatively, hardwired circuitry may be used in place of, or in combination with the software instructions. Thus, the computer 701 is not limited to any specific combination of circuitry, hardware, firmware, or software.

The term "computer readable storage medium," as used herein, may refer to any non-transitory storage medium that participates in providing instructions to the various processor components of the computer 701 for execution. Such a medium may take various forms including, but not limited to, non-volatile media, volatile media, and transmission media. Non-volatile media comprises, for example, configured/programmed active elements of the scan processor 42 (and other components of the scanner system 30) the CPU 704, the DSP/GPU 744, the non-transitory image related media 710, stored instructions 783, and other optical, electronic, or magnetic media. Volatile media comprises dynamic memory associated, e.g., with the RAM 706.

Transmission media comprises coaxial cables, copper wire and other electrical conductors and fiber optics, including the wires (and/or other conductors or optics) that comprises the data bus 702.

Transmission media can also take the form of electromagnetic radiation (e.g., light waves), such as may be generated at RF, and IR and other optical frequencies. Data communications may also be effectuated using other means, including acoustic (e.g., sound related) or other mechanical, vibrational, or phonon related media.

Non-transitory computer-readable storage media may comprise, for example, flash drives such as may be accessible via universal serial bus (USB) or any medium from which the computer 701 can access, read, receive, and retrieve data.

Various forms of non-transitory computer readable storage media may be involved in carrying one or more sequences of one or more instructions to CPU 704 for execution. For example, the instructions may initially be carried on a magnetic or other disk of a remote computer (e.g., computer 798). The remote computer can load the instructions into its dynamic memory and send the instructions over networks 788.

The scanning system 30 can receive the data over the network 788 and use an IR, RF, or other transmitter means to convert the data to corresponding signals. An IR, RF or other signal detector or receiver ("receiver") coupled to the data bus 702 can receive the data carried in the corresponding signals and place the data on data bus 702. The operations associated with the transmitter and the receiver may be combined in a transceiver. The transmitter, receiver, and/or transceiver may be associated with the interfaces 718.

The data bus 702 carries the data to main memory 706, from which CPU 704 and the DSP/GPU 744 retrieve and execute the instructions. The instructions received by main memory 706 may optionally be stored on storage device 710 either before or after execution by CPU 704.

The interfaces 718 may comprise a communication interface coupled to the data bus 702. The communication interface is operable for providing a two-way (or more) data communication coupling to a network link 720, which may connect wirelessly over RF to the network 788. Wireless communication may also be implemented optically, e.g., at IR frequencies.

Signals may be exchanged via the interfaces 718 with an external device 799 (e.g., another computer or external storage device) through a compatible communication port 719. The input receiver 417 may provide signals to the components 775 of the scanner system 30, and other components of the computer 701 via the port 719.

In any implementation, the communication interface 718 sends and receives electrical, electromagnetic or optical signals that carry digital data streams representing various types of information. The network link 720 provides data communication through the network 788 to other data devices. The input receiver 417 may provide signals to the printer system 100 and other components of the computer 701 via the network links 720 and/or the data communications network 788.

The network 788 may use one or more of electrical, electromagnetic, and/or optical signals carrying digital data streams. The signals sent over the network 788 and through the network link 720 and communication interface 718 carry the digital data to and from the scanning system 30. The scanning system 30 can send messages and receive data, including program code, through the network 788, network link 720, and communication interface 718.

To supplement the present disclosure, this application incorporates entirely by reference the following commonly assigned patents, patent application publications, and patent applications:
U.S. Pat. No. 6,832,725; U.S. Pat. No. 7,128,266;
U.S. Pat. No. 7,159,783; U.S. Pat. No. 7,413,127;

U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,525;
U.S. Pat. No. 8,794,526; U.S. Pat. No. 8,798,367;
U.S. Pat. No. 8,807,431; U.S. Pat. No. 8,807,432;
U.S. Pat. No. 8,820,630; U.S. Pat. No. 8,822,848;
U.S. Pat. No. 8,824,692; U.S. Pat. No. 8,824,696;
U.S. Pat. No. 8,842,849; U.S. Pat. No. 8,844,822;
U.S. Pat. No. 8,844,823; U.S. Pat. No. 8,849,019;
U.S. Pat. No. 8,851,383; U.S. Pat. No. 8,854,633;
U.S. Pat. No. 8,866,963; U.S. Pat. No. 8,868,421;
U.S. Pat. No. 8,868,519; U.S. Pat. No. 8,868,802;
U.S. Pat. No. 8,868,803; U.S. Pat. No. 8,870,074;
U.S. Pat. No. 8,879,639; U.S. Pat. No. 8,880,426;
U.S. Pat. No. 8,881,983; U.S. Pat. No. 8,881,987;
U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Patent No. D716,285;
U.S. Design Patent No. D723,560;
U.S. Design Patent No. D730,357;
U.S. Design Patent No. D730,901;
U.S. Design Patent No. D730,902;
U.S. Design Patent No. D733,112;
U.S. Design Patent No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;

U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;

U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILEPHONE ADAPTER FOR ELECTRONIC TRANSACTIONS, filed Jul. 10, 2014 (Hejl);

U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HANDHELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HANDHELD DIMENSIONER WITH DATA-QUALITY INDICATION filed Oct. 21, 2014 (Laffargue et al.);
U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);
U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTI-FUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

Example embodiments of the present invention are thus described in relation to a scanning device, mobile scanner system, and method for scanning a source of information. During scan operations, the scanning device is energized by an on-board supercapacitor and is worn upon an extremity of a user. The scanning device is operable for scanning the information source, accessing the information from the source based on the scanning, and generating a signal comprising data related to the accessed information. The generated scan data signal is transmitted for processing to a base station, which is worn remotely from the scanning device, for example on the user's belt.

Embodiments of the present invention thus provide a mobile scanner system with a ring scanning component configured for wear upon the fingers of an operator's hand and independent of a power cable extended for providing its electrical energy. An example embodiment may be implemented in which the base station of the mobile scanner system is positioned, mounted, supported, and worn on a part of an operator's body, clothing, or accessories that are accessible, balanced, comfortable, convenient, efficient ergonomically, non-fatigue causing, safe, and secure. In an example embodiment, the ring scanner is energized independent of direct physical connection with the base electrical power source battery, and without adding the weight and size of a dedicated on-board battery thereto.

For clarity and brevity, as well as to avoid unnecessary or unhelpful obfuscating, obscuring, obstructing, or occluding features of an example embodiment, certain intricacies and details, which are known generally to artisans of ordinary skill in related technologies, may have been omitted or discussed in less than exhaustive detail. Any such omissions or discussions are neither necessary for describing example embodiments of the invention, nor particularly relevant to understanding of significant elements, features, functions, and aspects of the example embodiments described herein.

In the specification and/or figures, typical embodiments of the invention have been disclosed. The present invention is not limited to such example embodiments. The use of the term "and/or" includes any and all combinations of one or more of the associated listed items, and the term "or" is used in an inclusive (and not exclusive) sense. The figures are schematic representations and so are not necessarily drawn to scale. Unless otherwise noted, specific terms have been used in a generic and descriptive sense and not for purposes of limitation.

What is claimed is:

1. A device, comprising:
a wireless scanner designed to be worn upon an extremity of a user and operable to scan a target having machine-readable information to obtain the machine-readable information, wherein the wireless scanner comprises a supercapacitor power source to provide power to the wireless scanner.

2. The device as described in claim 1 wherein the wireless scanner is further operable for providing a generated wireless signal to a base station operable for processing the provided signal and worn by the user in a position remote from the scanning component.

3. The device as described in claim 2 wherein the wireless scanner comprises a first transceiver, wherein the base station comprises a second transceiver operable for exchanging data signals with the first transceiver, the data signals relating to the generated signal comprising the data related to the machine-readable information.

4. The device as described in claim 1 wherein the wireless scanner comprises:
a light source operable for illuminating a scan target with an illuminating light; and
a light sensor operable for detecting a reflection of the illuminating light from the scan target.

5. The device as described in claim 1 wherein the machine-readable information comprises a graphic medium, and wherein the scanning of the machine-readable information is performed optically.

6. The device as described in claim 1 wherein the machine-readable information comprises one or more of an indicia or a symbol.

7. The device as described in claim 1 wherein the machine-readable information comprises one or more of a one dimensional (1D) data pattern, a two dimensional (2D) data pattern, or a geometric data pattern.

8. The device as described in claim 1 wherein the machine-readable information comprises a bar code data pattern.

9. The device as described in claim 1 wherein the machine-readable information comprises a matrix code data pattern.

10. The device as described in claim 1 wherein the machine-readable information comprises data related to text.

11. The device as described in claim 1 wherein the machine-readable information comprises a radio frequency identification (RFID) tag.

12. A system, comprising:
a wireless scanner designed to be worn upon an extremity of a user and operable to scan a target having machine-readable information to obtain the machine-readable information, wherein the wireless scanner comprises a supercapacitor power source to provide power to the wireless scanner;
a base station designed to be worn by the user in a position remote from the wireless scanner; and
an electrical power supply disposed locally in relation to the base station to provide power to the base station,
wherein the wireless scanner wirelessly outputs the machine-readable information to the base station to decode and the power supply charges the supercapacitor power source when the wireless scanner is docked to the base station.

13. The system as described in claim 12 wherein the position at which the base station is worn comprises one or more of an article of clothing or an accessory item worn by the user, wherein the clothing article or the accessory item supports the base station physically.

14. The system as described in claim 13 wherein the clothing article or the accessory item comprises one or more of a belt, vest, strap, pocket disposed in the clothing article, or pouch suspended from one or more of the belt or strap.

15. The system as described in claim 12 wherein the electrical power supply comprises:
a battery; and
a port for charging the supercapacitor power source of the wireless scanner.

16. The system as described in claim 12 wherein the wireless scanner comprises a first of a plurality of substantially identical and operationally interchangeable scanning components, and wherein the system comprises at least a second of the scanning components.

17. The system as described in claim 16 wherein, during the operation of the first scanning component, the at least second scanning component is, optionally, rechargeable.

18. The system as described in claim 12 wherein the supercapacitor power source comprises a first of a plurality of substantially identical and operationally interchangeable supercapacitor power sources, wherein the system comprises at least a second of the supercapacitor power sources, and wherein, during the operation of the first supercapacitor power source, the at least second s supercapacitor power source is, optionally, rechargeable.

19. A method, comprising:
energizing, with a supercapacitor device, a wireless scanner worn, during a scan operation performed over a target having machine-readable information, upon an extremity of a user;
obtaining the machine-readable information based on the scan operation performed over the target; and
generating a signal comprising data related to the obtained information, wherein the generated data signal is processed in relation to reading the obtained information.

20. The method as described in claim 19 wherein the supercapacitor device comprises a first of a plurality of supercapacitor devices, the method further comprising the steps of:
charging at least a second of the supercapacitor devices; and
replacing the first of the supercapacitor devices with the at least second of the supercapacitor devices wherein, upon the replacing step, the step of energizing the scanner is performed by the at least second of the supercapacitor devices.

* * * * *